April 1, 1958
J. R. PERRY
2,828,880
LOADER FOR INDUSTRIAL TRUCKS
Filed May 3, 1956
3 Sheets-Sheet 1
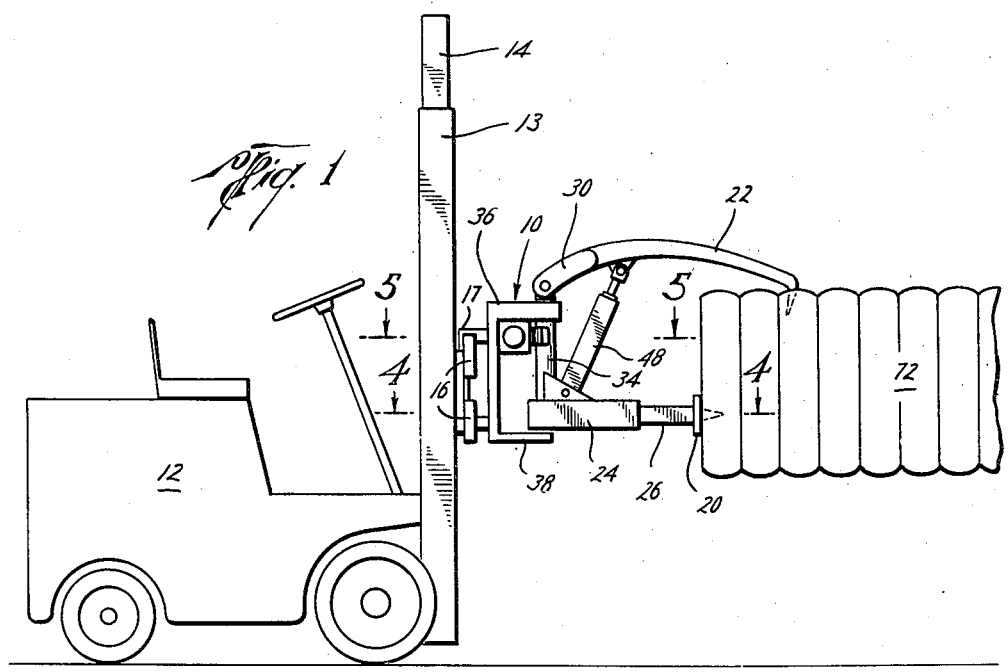
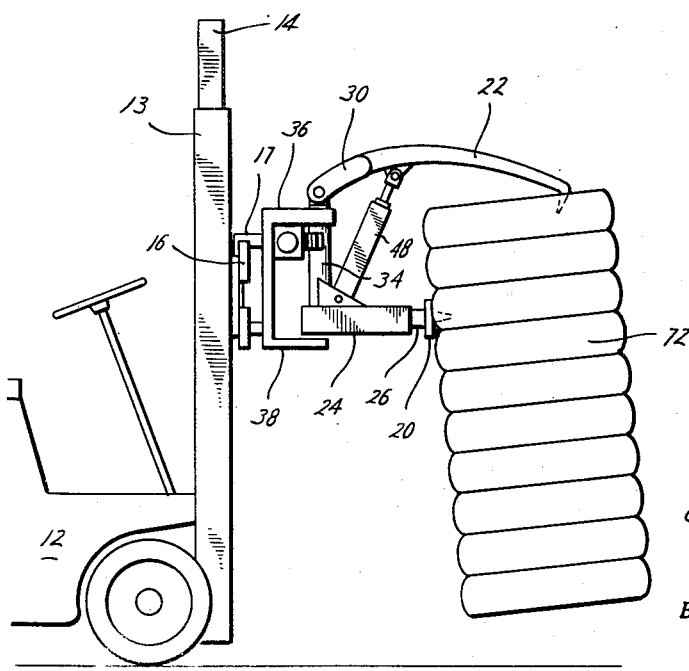
Joseph R. Perry
INVENTOR.
BY James F. Wiler &
Jefferson D. Giller
ATTORNEYS April 1, 1958   J. R. PERRY   2,828,880
LOADER FOR INDUSTRIAL TRUCKS
Filed May 3, 1956   3 Sheets-Sheet 2
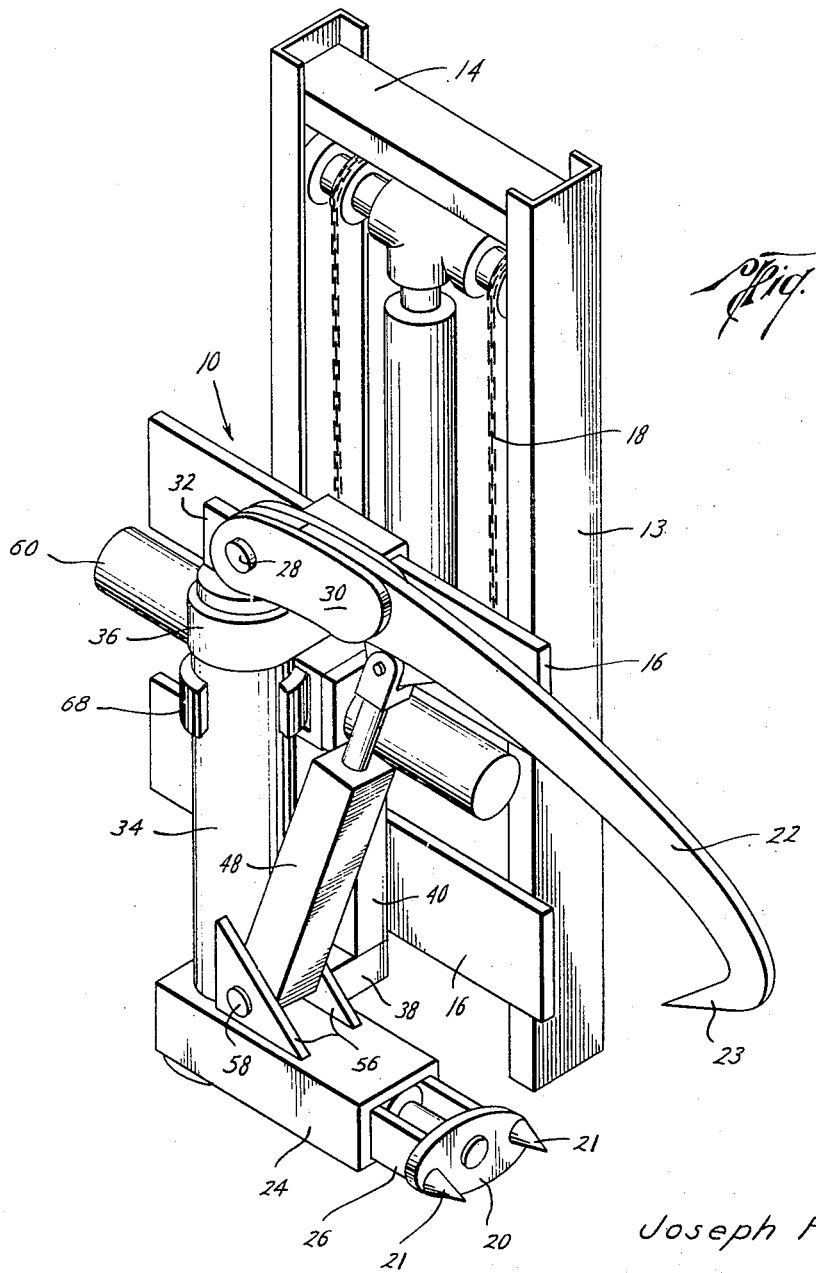
Joseph R. Perry
INVENTOR.
BY James F. Wiles
Jefferson D. Killer
ATTORNEYS April 1, 1958 J. R. PERRY 2,828,880
LOADER FOR INDUSTRIAL TRUCKS
Filed May 3, 1956 3 Sheets-Sheet 3
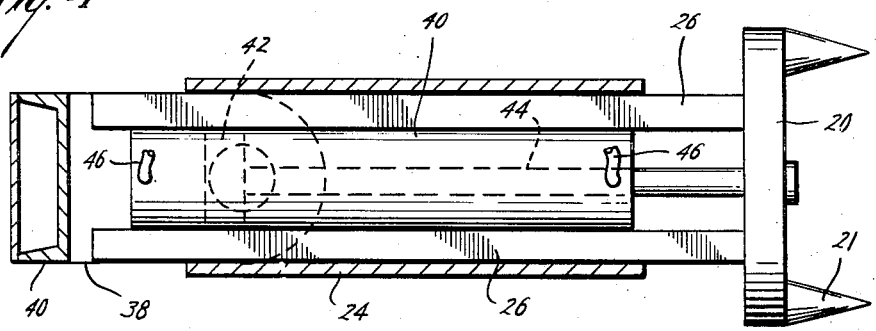
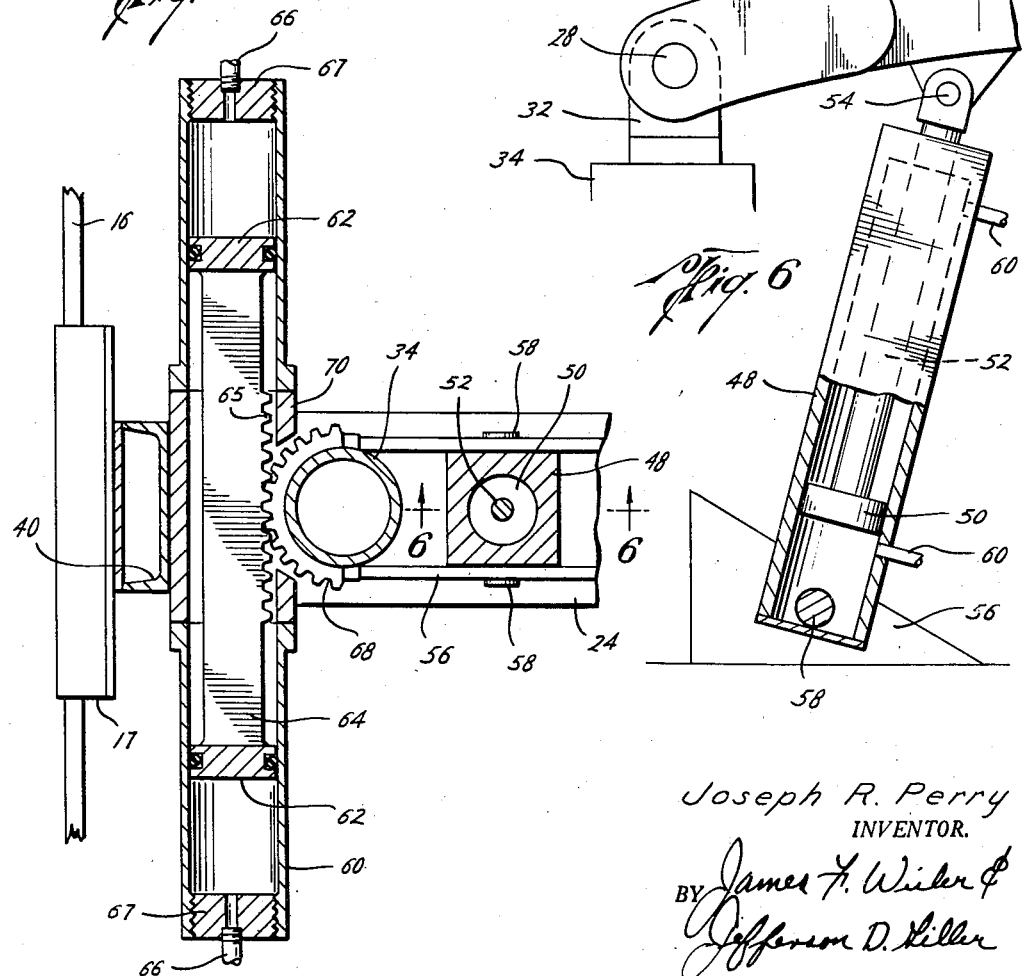
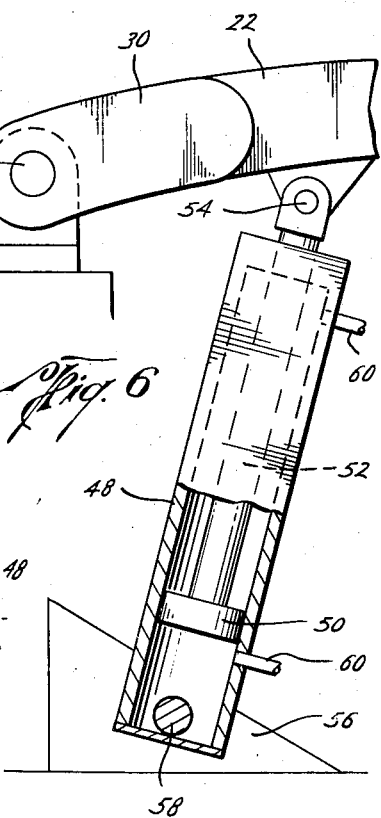
Joseph R. Perry
INVENTOR.
BY
ATTORNEYS

United States Patent Office 2,828,880
Patented Apr. 1, 1958

2,828,880

LOADER FOR INDUSTRIAL TRUCKS

Joseph R. Perry, Houston, Tex., assignor to Anderson, Clayton & Co., Houston, Tex., a corporation of Delaware Application May 3, 1956, Serial No. 582,423

8 Claims. (Cl. 214—730)

This invention relates to loaders for industrial trucks and more particularly relates to loaders or clamping devices which are particularly useful in clamping or gripping bales of cotton and removing them from confined places.

Various clamps and gripping devices have been proposed for engaging and disengaging various objects for loading and unloading them as required. Particularly in the case of breaking out bales of cotton stacked together in rows four or five high, these clamps and gripping devices have not been successful as they cannot grip a particular bale of cotton due to space limitations. For this purpose, it is customary in the trade to provide on an industrial truck a boom-type hoist which has a manually-actuated clamp. Provision is made on the carriage of the boom attached to the industrial truck for raising a man who manually fixes the clamp to the bale of cotton so that it might be broken out of the stacks of bales of cotton.

The use of a boom-type clamp arrangement is slow, requires the use of an additional man and many serious accidents have happened to the man riding on the carriage. It would therefore be highly advantageous and it is one of the objects of the invention to provide a loading and unloading clamping mechanism which is so constructed and arranged as to easily, readily and efficiently engage and grip a selected bale of cotton among rows of stacks of bales of cotton, and one in which it is unnecessary to have a helper riding on the carriage and performing the clamping action manually.

A still further object of the present invention is the provision of a clamping device by which objects stacked close together may be clamped or gripped, for example, bales of cotton, and which is durable and rugged in use, which is easily repaired and maintained and which is of simplified construction.

Yet a further object of the present invention is the provision of a cotton loader or breakout device by which selected bales of cotton in confined and remote places may easily, readily and efficiently be clamped so that they may be broken out of the stack for loading, relocating and the like.

Yet a further object of the present invention is the provision of a hydraulically-operated clamping mechanism by which selected bales of cotton may mechanically be clamped while in a stack thereof and one in which it is unnecessary to use a helper to clamp the bales of cotton by hand.

Yet a further object of the present invention is the provision of a load-gripping or clamping device which may be moved or swung into a large number of different positions to grip or clamp an object without the necessity of moving the industrial truck to which it is attached.

Other and further objects, features and advantages will be apparent from a description of the invention given for the purpose of disclosure. The present invention is particularly adapted for use in connection with gripping and moving bales of cotton and the example of the invention given for the purpose of disclosure is directed toward that particular use. It will be understood, however, that the clamping or gripping mechanism of the present invention may be used to grip a wide variety of articles and may be used for widely varying uses.

The following description is given in connection with the accompanying drawings, where like reference numerals designate like parts throughout the several views, and where Figure 1 is a side elevation illustrating a clamping or gripping mechanism according to the invention shown clamping a bale of cotton in endwise position and shown secured to a conventional industrial truck, Figure 2 is a fragmentary view, similar to that of Figure 1, but illustrates the clamp mechanism of Figure 1 engaging a bale of cotton in an upright position, Figure 3 is an enlarged perspective view illustrating the clamping mechanism of Figures 1 and 2 and shown secured to the upright standards of an industrial truck, Figure 4 is a cross-sectional view taken along line 4—4 of Figure 1, and illustrates a presently preferred loading-engaging assembly for engaging a side of the bale of cotton, Figure 5 is a cross-sectional view taken along the line 5—5 of Figure 1 and illustrates a presently preferred mechanism for swinging the clamping or gripping device about a generally vertical axis, Figure 6 is a sectional elevation taken along the line 6—6 of Figure 5, and illustrates means for swinging what might be termed the hook assembly into and out of engagement with a bale of cotton.

Referring now to the drawings, and particularly to Figure 1, a clamp or load gripping assemby constructed in accordance with the present invention is indicated by the reference numeral 10, and is shown as being connected to a conventional industrial truck 12. The truck 12 may be of any desired type, and constitutes no part of the present invention; hence, no detailed description thereof is deemed necessary. In order that the clamping or gripping mechanism of the present invention can be actuated hydraulically, however, it is necessary that the truck 12 have the usual hydraulic connections and the like. Customarily it will have the upright standards 13 and, for breaking out bales of cotton, it ordinarily will also have the extensions thereof 14 to which the clamp 10 is connected in the usual manner.

Referring now to Figure 3, what might be termed the clamp carriage, which may include the two transverse members 16, is slidably secured to the uprights 13 and is movable by means of the chains 18 in the usual manner. The clamping mechanism includes what might be termed a load engaging assembly which includes the load engaging element 20 at the lower end of the clamp mechanism and includes what might be termed a hook assembly including the hook arm 22 disposed at the upper end. The load engaging element 20 is slidably mounted in a guide member 24 and has the slides 26 slidably extending therein for sliding movement relative thereto.

The hook arm 22 is pivotally connected by means of the pin 28 and bracket 30 to the upper end 32 of an upright member or shaft 34 which is generally disposed so as to be rotatable about a vertical axis.

The shaft 34 is rotatably supported in a vertical position by means of a bracket including the generally horizontal arms 36 and 38 secured to the vertically-extending channel 40, which in turn is secured to the two transverse carriage members 16 by means of the extensions 17 (see Figures 1 and 2). The shaft 34 is thus journaled in the projecting bracket arms 36 and 38 and is adapted to swing about a vertical axis in an arc of approximately 180°. This advantageously permits flexibility of use without having to change the position of the truck 12 as, for example, in between rows of stacks of bales of cotton where the truck cannot change position due to space limitations.

The load engaging element 20, the hook arm 22 and the rotatable upright 34 may be actuated in any satisfactory manner; however, good results have been obtained by actuating these members hydraulically and by using the hydraulic system (not shown) of the truck as the source of hydraulic power.

Referring to Figure 4, the guide 24 and slide 26 arrangement in connection with the load engaging element 20 is illustrated and a piston cylinder 40 is provided between the slide arms 26 into which is disposed the piston 42 to which is secured the piston rod 44 which extends outwardly of the cylinder 40 and is secured to the load engaging element 20. The hydraulic connections 46 are provided at each end of the cylinder 40 which connect with the hydraulic system (not shown) of the industrial truck so that the load engaging plate 20 may be moved outwardly and retracted for engaging and disengaging a load, for example, a cotton bale.

A similar arrangement is provided for swinging the hook arm 22, and as best seen in Figure 6, a piston cylinder 48 is provided in which a piston 50 is slidably disposed. A piston rod 52 is secured thereto and extends outwardly of the piston cylinder 48 and is pivotally secured to the hook arm 22 by means of the pivot pin 54. Since in swinging the hook arm 22 in a generally vertical plane will in turn cause a movement with respect to the axis of the piston and cylinder assembly effecting this movement, the piston cylinder 48 is pivotally secured to the brackets 56 secured to the guide 24 by means of the pivot pin 58. The usual hydraulic connections 60 are provided at each end of the cylinder 48 and are connected to the hydraulic system (not shown) of the industrial truck. Thus, as hydraulic pressure is applied to each end of the piston cylinder 48, the hook arm 22 reciprocates or swings up and down in a generally vertical plane for hooking into and out of a load, such as a bale of cotton. The hook arm includes the pointed hook 23 for this purpose and the load-engaging plate 20 includes one or more pointed projections 21 for securely engaging the load.

The presently-preferred means for imparting rotation to the vertical upright member 34 of the clamping device is best illustrated in Figure 5, and turning now to this figure, a generally horizontally-disposed piston cylinder 60 is secured to the channel frame member 40 and has the spaced pistons 62 provided therein which are secured together by a common piston rod 64. The usual hydraulic connections 66 are provided at each end of the piston cylinder 60 so that hydraulic pressure may be supplied from the hydraulic system (not shown) of the industrial truck in the usual manner. The cylinder heads 67 close each end of the cylinder 60. No description of the details of construction of the various piston and cylinder assemblies are given as these may be constructed as desired. Thus, the pistons 62 and 64 reciprocate in the piston cylinder 60 as a unit.

It is noted that the piston rod 64 is substantially enlarged and includes a gear rack 65 which intermeshes with a gear segment 68 secured to the upright shaft 34. An opening 70 is provided in the central front portion of the cylinder 60 for receiving the gear segment 68 so that it might mesh with the rack 66. Thus, upon reciprocation of the rack 64 the gear segment 68 is rotated thereby in turn transmitting or imparting rotation to the vertical shaft 34. This, in turn, imparts rotation to the load engaging assembly and hook assembly secured thereto.

In operation, the load clamping or gripping assembly is assembled as described and, turning to Figure 1, the hydraulic controls (not shown) on the industrial truck 12 are manipulated by the operator so that the clamping device is swung in the proper direction and moved to the proper elevation to grip or clamp a preselected bale of cotton 72. In Figure 1, the load-engaging plate 20 has been extended out to engage the side of the bale 72 generally at a central portion and the hook 22 has been swung downwardly to hook into the top thereof. In this manner, the carriage may be manipulated by the hydraulic system to raise or lower or swing the bale of cotton out of a stack and load it or relocate it as desired. It is noted that the clamping device does not depend upon gripping the bale at each side but grips the central portions of an exposed end and the top of the bale of cotton 72. Thus, the clamping device effectively clamps or grips bales of cotton without sidewise compression or other means and removes them from confined places heretofore not possible without the aid of a helper to manually fix a clamp on the bale.

Figure 2 shows the clamping mechanism clamping or gripping a bale 72 in a vertical position in which the load engaging plate 20 engages the central portion of the side and the hook engages the top when in such a vertical position.

Thus, the clamping or gripping device of the present invention is highly effective and flexible in use and enables the operator to rapidly and quickly grip objects, such as bales of cotton, which are closely-stacked together and which may be in high and remote places, for example, cotton bales stacked four and five high in warehouses.

The gripping device or clamp or the present invention is particularly adapted for and effective for gripping and clamping bales of cotton, as described, but may also be used for other objects in which it will not damage the object to grip them in the manner described; however, where the pointed ends are objectionable other means such as shaped ends to conform with the contour of the object to be raised or friction pads may be substituted for the pointed ends.

The present invention, therefore, is well adapted and suited to carry out the objects and has the advantages and features mentioned as well as others inherent therein.

Thus, while only a single presently preferred example of the invention is given for the purpose of disclosure, various modifications and arrangements of parts and details of construction will readily suggest themselves to those skilled in the art which are encompassed within the spirit of the invention and the scope of the appended claims.

What is claimed is:

1. A clamp for industrial trucks comprising, a clamp carriage, a generally vertically-disposed shaft carried by the clamp carriage and rotatable generally about a vertical axis, means for rotating said shaft about said vertical axis, a load engaging assembly secured to said shaft, said load engaging assembly including a load engaging element reciprocally mounted for movement in a generally horizontal direction and means for moving said load engaging element into and out of engagement with the load, and a hook assembly secured to said shaft, said hook assembly including a hook arm mounted generally for movement in a vertical direction and means for moving said hook arm into and out of engagement with said load whereby said load may be clamped by said load engaging element and said hook arm.

2. The clamp of claim 1 where the load engaging assembly includes a guide secured to the shaft and a pair of slides slidably disposed in the guide and secured to the load engaging element.

3. The clamp of claim 1 where the load engaging element includes at least one projection for projecting into the load upon engagement thereof.

4. A load gripping device for industrial trucks comprising, a carriage adapted to be secured to a pair of uprights of the lift truck, a generally vertically-disposed bracket secured to the lift carriage, a shaft rotatably mounted in the bracket for rotation about a generally-vertical axis, a generally horizontally-disposed cylinder secured to the lift carriage, a pair of spaced pistons in the cylinder, a piston rod disposed between and secured to the spaced pistons, a rack disposed on the central portion of the piston rod, a gear disposed on the shaft and meshing with the gear rack, means at each end of the cylinder for supplying hydraulic pressure thereto for reciprocation of said pistons and piston rod thereby imparting rotation to said shaft, a generaly horizontally-extending load engaging assembly secured to said shaft, said load engaging assembly including a guide member, a pair of slides slidably mounted in said guide member, a load engaging element secured to the outer ends of said slides, and means for reciprocating said load engaging element into and out of engagement with a load, and a generally vertically-disposed hook assembly secured to said shaft, said hook assembly including a hook arm pivotally mounted to the upper end of said shaft, and means pivotally linked to said shaft and said hook arm for moving said hook arm into and out of engagement with said load, each of said means for moving said load engaging element and said hook arm including a cylinder, a piston slidable in each cylinder, a piston rod secured to each piston and secured one each to said load engaging element and pivotally to said hook arm, and means at each end of each cylinder for supplying hydraulic fluid thereto.

5. The load gripping device of claim 4 including at least one projection on the load engaging element for penetrating the load upon engagement thereof.

6. A clamp for industrial trucks comprising, a clamp carriage, a generally vertically-disposed shaft carried by the clamp carriage and rotatable generally about a vertical axis, means for rotating said shaft about said vertical axis, a load engaging assembly secured to said shaft, said load engaging assembly including a load-engaging element reciprocally mounted for movement in a direction generally normal to the side of a load to be clamped, means carried by the shaft for reciprocating said load-engaging element into and out of engagement with the load, and a hook assembly secured to said shaft above said load-engaging assembly, said hook assembly including a hook arm mounted generally for movement in an upward and downward direction, and means carried by said shaft for moving said hook arm into and out of engagement with said load whereby said load may be clamped by said load engaging element and said hook arm.

7. A clamp for industrial trucks comprising, a clamp carriage; a generally vertically-disposed shaft carried by the clamp carriage and rotatable generally about a vertical axis; means for rotating said shaft about said vertical axis said means including a piston cylinder secured to the clamp carriage, a pair of pistons disposed in said piston cylinder, a piston rod disposed in said piston cylinder, a piston rod disposed between and connecting said pistons, a gear rack on the piston rod, a gear segment meshing with said gear rack and secured to said shaft, and means for supplying hydraulic pressure to opposite ends of said piston cylinder for reciprocating said pistons and piston rod and thereby rotating said shaft; a load engaging assembly secured to said shaft, said load engaging assembly including a load engaging element reciprocally mounted for movement in a generally horizontal direction and means for moving said load engaging element into and out of engagement with the load; and a hook assembly secured to said shaft, said hook assembly including a hook arm mounted generally for movement in a vertical direction and means for moving said hook arm into and out of engagement with said load whereby said load may be clamped by said load engaging element and said hook arm.

8. A clamp for industrial trucks comprising, a clamp carriage; a generally vertically-disposed shaft carried by the clamp carriage and rotatable generally about a vertical axis; means for rotating said shaft about said vertical axis; a load engaging assembly secured to said shaft, said load engaging assembly including a load engaging element reciprocally mounted for movement in a generally horizontal direction and means for moving said load engaging element into and out of engagement with the load; and a hook assembly secured to said shaft, said hook assembly including a hook arm mounted generally for movement in a vertical direction and means for moving said hook arm into and out of engagement with said load whereby said load may be clamped by said load engaging element and said hook arm; said means for moving the load engaging element into and out of engagement with the load and said means for moving the hook arm into and out of engagement with the said load each comprising a piston cylinder carried by the clamp carriage, a piston in each piston cylinder, a piston rod secured to each piston, one of said piston rods connected to the load engaging element and the other of said piston rods connected to the hook arm, and means at each end of each cylinder for introducing hydraulic pressure thereto.

References Cited in the file of this patent
UNITED STATES PATENTS

| | | |
|---|---|---|
| 2,538,505 | Carter | Jan. 16, 1951 |
| 2,578,802 | Heidrick et al. | Dec. 18, 1951 |
| 2,587,769 | Rowe | Mar. 4, 1952 |
| 2,595,131 | Ehmann | Apr. 29, 1952 |
| 2,596,477 | Frischmann et al. | May 13, 1952 |
| 2,682,350 | Garrett | June 29, 1954 |
| 2,706,570 | Jewell et al. | Apr. 19, 1955 |
| 2,768,760 | Pilch | Oct. 30, 1956 |
| 2,781,140 | Cryderman | Feb. 12, 1957 |